(12) United States Patent
Tokura et al.

(10) Patent No.: US 8,983,742 B2
(45) Date of Patent: Mar. 17, 2015

(54) VEHICULAR CONTROL APPARATUS

(71) Applicants: Takaaki Tokura, Nagoya (JP); Hiroyuki Sawada, Okazaki (JP); Naoto Moriya, Toyota (JP)

(72) Inventors: Takaaki Tokura, Nagoya (JP); Hiroyuki Sawada, Okazaki (JP); Naoto Moriya, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/979,341

(22) PCT Filed: Oct. 11, 2012

(86) PCT No.: PCT/JP2012/006535
§ 371 (c)(1),
(2) Date: Jul. 11, 2013

(87) PCT Pub. No.: WO2013/054530
PCT Pub. Date: Apr. 18, 2013

(65) Prior Publication Data
US 2014/0214288 A1     Jul. 31, 2014

(30) Foreign Application Priority Data
Oct. 13, 2011   (JP) ................................. 2011-225716

(51) Int. Cl.
*B60W 10/06*    (2006.01)
*B60W 10/10*    (2012.01)
*F16H 61/16*    (2006.01)
*F16H 61/02*    (2006.01)
*F16H 59/20*    (2006.01)

(52) U.S. Cl.
CPC ............ *F16H 61/16* (2013.01); *F16H 61/0213* (2013.01); *F16H 59/20* (2013.01)

USPC .................................. 701/52; 701/55; 701/60

(58) Field of Classification Search
USPC ........................... 701/52, 55, 60, 62; 477/115
See application file for complete search history.

(56) References Cited

U.S. PATENT DOCUMENTS

| 5,241,476 A * | 8/1993 | Benford et al. ................. 701/58 |
| 6,773,373 B2 * | 8/2004 | Henneken et al. ............ 477/115 |
| 2002/0095250 A1 * | 7/2002 | Yeo ................................ 701/55 |

(Continued)

FOREIGN PATENT DOCUMENTS

| JP | 05-231515 A | 9/1993 |
| JP | 2010-077997 A | 4/2010 |

(Continued)

OTHER PUBLICATIONS

International Search Report for PCT/JP2012/006535, dated Jan. 15, 2013.

*Primary Examiner* — Edwin A Young
(74) *Attorney, Agent, or Firm* — Sughrue Mion, PLLC

(57) ABSTRACT

A control apparatus for controlling a vehicle having an automatic transmission arranged to transmit a vehicle drive force from a drive power source of the vehicle to drive wheels of the vehicle, such that a shift-down operation of the automatic transmission is performed as a result of a kick-down operation, the control apparatus includes a shift-down operation permitting/inhibiting portion configured to restrict the shift-down operation of the automatic transmission as a result of the kick-down operation, if a running speed of the vehicle upon detection of the kick-down operation is lower than a lower limit predetermined for a presently established gear positions or speed ratio of the automatic transmission.

7 Claims, 4 Drawing Sheets

(56) References Cited

U.S. PATENT DOCUMENTS

2007/0244616 A1* 10/2007 Roudeau et al. ............... 701/52
2010/0017078 A1* 1/2010 Petzold et al. ................. 701/52

FOREIGN PATENT DOCUMENTS

| | | |
|---|---|---|
| JP | 2010-203590 A | 9/2010 |
| JP | 2010269637 A | 12/2010 |

* cited by examiner

VEHICULAR CONTROL APPARATUS

CROSS REFERENCE TO RELATED APPLICATIONS

This application is a National Stage of International Application No. PCT/JP2012/006535 filed Oct. 11, 2012, claiming priority based on Japanese Patent Application No. 2011-225716 filed Oct. 13, 2011, the contents of all of which are incorporated herein by reference in their entirety.

TECHNICAL FIELD

The present invention relates to a control apparatus for a vehicle having an automatic transmission which is shifted down upon a kick-down operation of an accelerator pedal.

BACKGROUND ART

There is well known a vehicle having an automatic transmission configured to transmit a drive force from a drive power source toward drive wheels. Patent Documents 1-3 disclose examples of such type of vehicle. Generally, this type of vehicle is generally is arranged to implement a basic shift control of the automatic transmission. The basic shift control is implemented to determine or select one of gear positions (operating positions, speed positions) or gear ratios (speed ratios) of the automatic transmission, on the basis of a state of the vehicle as represented by a running speed of the vehicle and an operation amount of an accelerator pedal (a manually operated vehicle accelerating member, and according to a relation such as a shifting map which is stored in a memory and which represents a predetermined relationship between the vehicle state and the gear position (or gear ratio) of the automatic transmission that is to be selected or established. The automatic transmission is shifted to the selected gear position (or gear ratio) to establish the corresponding speed ratio. In addition to this basic shift control, the automatic transmission is controlled to be shifted down from the presently established gear position, upon detection of a so-called "kick-down operation" of the accelerator pedal by a kick-down operation detecting switch, for example. This shift-down operation of the automatic transmission is unnecessary if the acceleration of the vehicle required by the vehicle operator who has kicked down the accelerator pedal can be realized without the shift-down operation, for instance, if the vehicle is running down on a downhill roadway. Patent Document 1 discloses a control technique to compare the required vehicle acceleration value represented by the operation amount of the accelerator pedal with an estimated vehicle acceleration value to be achieved as a result of the kick-down operation of the accelerator pedal, and to inhibit the unnecessary shift-down operation of the automatic transmission if the estimated vehicle acceleration value reaches the required vehicle acceleration value.

CITATION LIST

Patent Literature

PTL 1: Patent Document 1: JP-5-231515 A
PTL 2: Patent Document 2: JP-2010-203590 A
PTL 3: Patent Document 3: JP-2010-77997 A

SUMMARY OF INVENTION

Technical Problem

By the way, the control technique disclosed in Patent Document 1 permits the shift-down operation of the automatic transmission, causing an increase of the vehicle drive force, if the estimated vehicle acceleration value does not reach the required vehicle acceleration value. However, this control technique which does not take account of the amount of increase of the vehicle drive force caused by the shift-down may suffer from an increase of the vehicle drive force by an amount larger than expected by the vehicle operator, giving the vehicle operator a discomfort with the unexpectedly large amount of increase of the vehicle drive force. It is noted that this problem is not publicly known, and that there has been no proposal to permit or inhibit the shift-down operation of the automatic transmission upon detection of the kick-down operation of the vehicle accelerating member, while taking account of the change amount of the vehicle drive force caused by the shift-down operation.

The present invention was made in view of the background art described above. It is therefore an object of the present invention to provide a control apparatus for a vehicle having an automatic transmission, which control apparatus can reduce or prevent a discomfort given to the vehicle operator as a result of a shift-down operation of the automatic transmission performed upon detection of a kick-down operation of a vehicle accelerating member by the vehicle operator.

Solution to Problem

The object indicated above is achieved according to the principle of the present invention, which provides a control apparatus for controlling a vehicle having an automatic transmission arranged to transmit a vehicle drive force from a drive power source of the vehicle to drive wheels of the vehicle, such that a shift-down operation of the automatic transmission is performed as a result of a kick-down operation, the control apparatus comprising a shift-down operation permitting/inhibiting portion configured to restrict the shift-down operation of the automatic transmission as a result of the kick-down operation, if a running speed of the vehicle upon detection of the kick-down operation is lower than a lower limit predetermined for a presently established gear positions or speed ratios of the automatic transmission.

Advantageous Effects of Invention

The above-indicated vehicle having the automatic transmission arranged to transmit the vehicle drive force from the vehicle drive power source to the vehicle drive wheels generally has a tendency that the maximum vehicle drive force obtained in each of the gear positions (at each of the speed ratios) of the automatic transmission decreases with an increase of a running speed of the vehicle, so that an amount of increase of the vehicle drive force caused by each shift-down operation of the automatic transmission increases with a decrease of the vehicle running speed. According to the present invention, the shift-down operation permitting/inhibiting portion inhibits at least one of the shift-down operations of the automatic transmission as a result of the kick-down operation of the vehicle accelerating member, if the running speed of the vehicle upon detection of the kick-down operation is lower than or equal to the predetermined lower limit. Accordingly, the shift-down operation permitting/inhibiting portion prevents or reduces a discomfort given to the vehicle operator as a result of the shift-down operation of the automatic transmission which causes an increase of the vehicle drive force by an amount larger than expected by the vehicle operator who has performed the kick-down operation of the vehicle accelerating member.

According to a first preferred form of the present invention, the shift-down operation permitting/inhibiting portion restricts the shift-down operation as a result of the kick-down operation such that the shift-down operation of the automatic transmission is inhibited at least to a predetermined final gear position thereof or to a predetermined final speed ratio thereof, upon detection of the kick-down operation. Thus, the shift-down operation permitting/inhibiting portion prevents or reduces the discomfort given to the vehicle operator as a result of the shift-down operation of the automatic transmission to the predetermined final operating position, which causes an unexpectedly large amount of increase of the vehicle drive force. In addition, the shift-down operation permitting/inhibiting portion permits the other shift-down operation(s) of the automatic transmission in order to meet the vehicle operator's desire to increase the vehicle drive force by the kick-down operation.

According to a second preferred form of the invention, the vehicle has a shift position selecting device configured to select one of an automatic shifting position for establishing an automatic shifting mode in which the automatic transmission is automatically shifted, and a manual shifting position for establishing a manual shifting mode in which the automatic transmission is manually shifted by an operation by the vehicle operator, and the shift-down operation permitting/inhibiting portion restricts the shift-down operations to be otherwise performed as a result of the kick-down operation performed while the manual shifting mode is established. This form of the invention prevents or reduces the discomfort given to the vehicle operator as a result of the kick-down operation performed while the manual shifting mode is established.

In one advantageous arrangement of the second preferred form of the invention, the control apparatus further comprises a shift control portion configured to shift down the automatic transmission from a presently established gear position or the speed ratio corresponding to the gear position to a next adjacent lower-speed the gear positions or the speed ratio, or to any gear position lower than the above-described next adjacent lower-speed operating position or the speed ratio, upon detection of the kick-down operation while the manual shifting mode is established, and the shift-down operation permitting/inhibiting portion inhibits the shift-down operations of the automatic transmission as a result of the kick-down operation in the manual shifting mode, if the running speed of the vehicle upon detection of the kick-down operation is lower than the lower limit. In this arrangement, the shift-down operation permitting/inhibiting portion prevents or reduces the discomfort given to the vehicle operator as a result of the shift-down operation of the automatic transmission to the predetermined final operating position upon detection of the kick-down operation in the manual shifting mode, which shift-down operation causes an unexpectedly large amount of increase of the vehicle drive force. In addition, the shift-down operation permitting/inhibiting portion may permit the other shift-down operation(s) of the automatic transmission in order to meet the vehicle operator's desire to increase the vehicle drive force by the kick-down operation performed in the manual shifting mode.

According to a third preferred form of the invention, the vehicle has a kick-down operation detecting switch configured to detect an operation of the vehicle accelerating member after an amount of operation of the vehicle accelerating member has reached a nominal maximum value, and the kick-down operation is detected when the kick-down operation detecting switch is operated. In this form of the invention, it is possible to effectively prevent or reduce the discomfort given to the vehicle operator regarding shift-down operations of the automatic transmission as a result of detection in the kick-down operation detection switch.

According to a fourth preferred form of the invention, the drive power source includes an engine, and a drive force difference between values of a maximum vehicle drive force obtained in respective two positions of the gear positions or speed ratios of the automatic transmission increases with a decrease of the running speed of the vehicle, and the lower limit of the running speed is a value above which said difference does not exceed an upper limit predetermined for the presently established gear position or speed ratios of the automatic transmission. In this form of the invention, it is possible to effectively prevent or reduce the discomfort given to the vehicle operator when the automatic transmission is shifted down as a result of the kick-down operation of the vehicle accelerating member.

According to a fifth preferred form of the invention, the above-described lower limit of the running speed of the vehicle is predetermined so as to increase with a decrease of a speed ratio of the presently established gear position of the automatic transmission, the speed ratio being a ratio of an input speed of the automatic transmission to an output speed of the automatic transmission. In this respect, it is noted that the vehicle runs at a relatively high speed or with a relatively small vehicle drive force when the automatic transmission is placed in the gear position having a relatively low speed ratio. In this form of the invention, the shift-down operation permitting/inhibiting portion inhibits the shift-down operation which is likely to give the vehicle operator a discomfort with an unexpectedly large amount of an increase of the vehicle drive force caused by the shift-down operation.

BRIEF DESCRIPTION OF DRAWINGS

The above and other objects, features, advantages and technical and industrial significance of the present invention will be better understood by reading the following detailed description of a preferred embodiment of this invention, when considered in connection with the accompanying drawings, in which.

DESCRIPTION OF EMBODIMENTS

Figure 1:
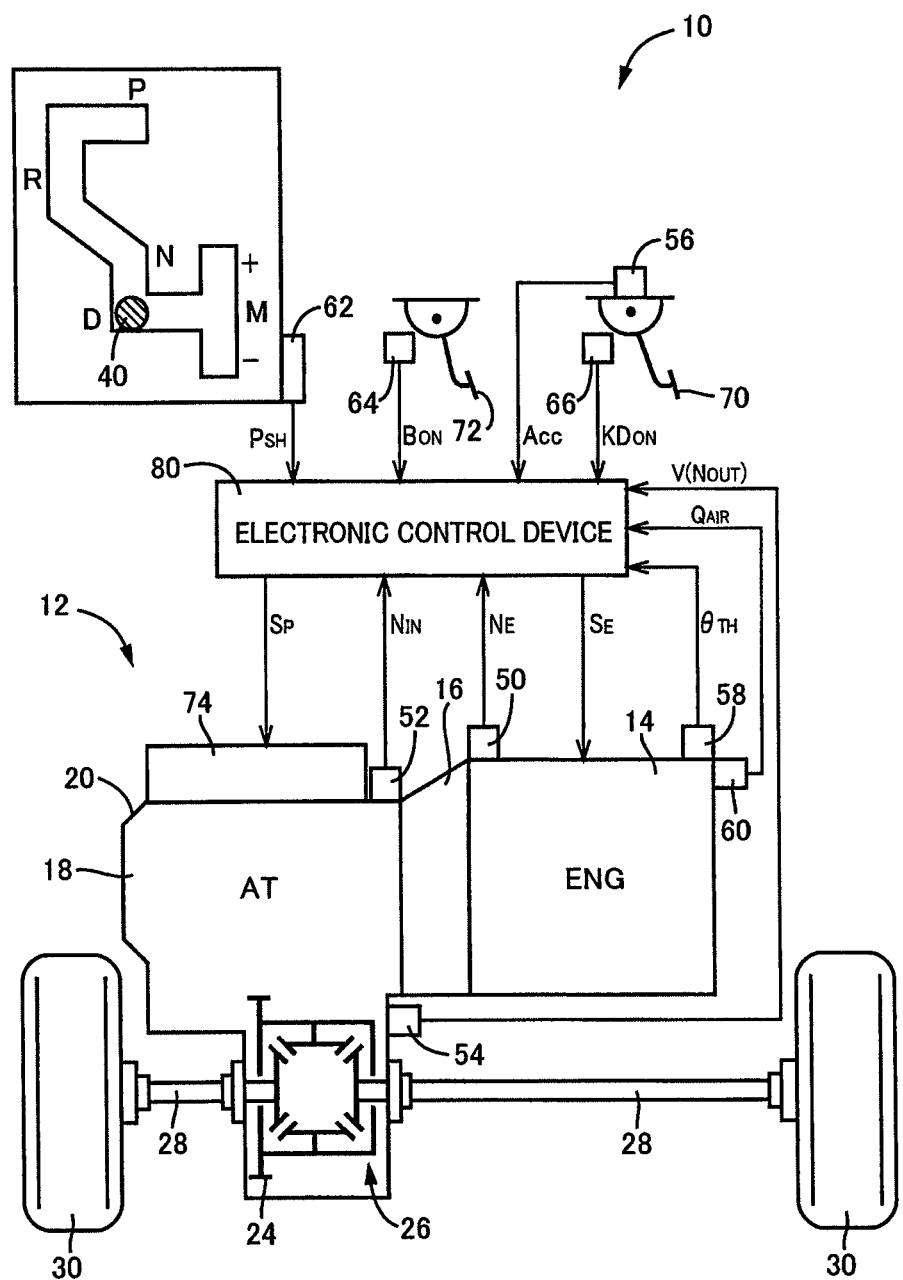
FIG. 1 is a schematic view showing an arrangement of a power transmitting path in a vehicle to which the present invention is applicable, and a major portion of a control system of the vehicle.

The vehicle to which the present invention is applicable is preferably provided with the drive power source including an internal combustion engine such as a gasoline or diesel engine constructed to produce a vehicle drive force by combustion of a fuel. However, the drive power source may consist of, or may further include any other types of drive power source such as an electric motor or electric motors.

The above-described automatic transmission may be: a known automatic transmission of a planetary gear type having a plurality of selectively established gear positions; a known automatic transmission of a synchronous meshing parallel two-axes type having a plurality of pairs of permanently meshing gears which are disposed on respective two axes and which are selectively placed into a power transmitting state by a synchronizing device driven by hydraulic actuators, for automatic shifting to a selected one of the gear positions; a so-called "dual clutch transmission (DCT)" which is an automatic transmission of a synchronous meshing parallel two-axes type having two input shafts which are connectable to respective clutches to establish respective two groups of odd-numbered and even-numbered gear positions; a so-called "belt type" continuously variable transmission which has a pair of variable-diameter pulleys connected by a transmission belt wound therebetween and a speed ratio of which is continuously variable; a so-called "traction type" continuously variable transmission which has a pair of cones rotatable about a common axis and a plurality of rollers rotatable about an axis intersecting the common axis of the pair of cones and pressed between the pair of cones to change an angle of intersection between the axes of the cones and rollers, for thereby continuously changing the speed ratio of the transmission; or an automatic transmission operable as an electrically controlled continuously variable transmission which has a differential mechanism constituted by a planetary gear device arranged to distribute a drive force from an engine to a first electric motor and an output shaft, and a second electric motor connected to the output shaft of the differential mechanism, and in which the differential mechanism performs a differential function to mechanically transmit a major portion of the drive force produced by the engine toward vehicle drive wheels, and to electrically transmit the remaining portion of the drive force through an electric path from the first electric motor to the second electric motor, for electrically changing the speed ratio of the transmission. The automatic transmission may be of a transverse type installed on the vehicle of an FF (front-engine front-drive) type such that the axis of the automatic transmission is parallel to the transverse or width direction of the vehicle, or a longitudinal type installed on the vehicle of an FR (front-engine rear-drive) type such that the axis of the automatic transmission is parallel to the longitudinal or running direction of the vehicle.

Referring to the drawings, an embodiment of this invention will be described in detail.

FIG. 1 is the schematic view showing an arrangement of a power transmitting path between an engine 14 and drive wheels 30 of a vehicle 10 to which the present invention is applicable, and a major portion of a control system of the vehicle 10. As shown in FIG. 1, a vehicular power transmitting device 12 (hereinafter referred to as "power transmitting system 12") includes a torque converter 16 and an automatic transmission 18 which are arranged in this order of description from a side of the engine 14 and which are disposed in a transaxle casing 20 (hereinafter referred to as "casing 20") which is a stationary member fixed to a body of the vehicle 10 by bolts or other fixing means. The power transmitting device 12 further includes a differential gear device 26 provided with an integrally formed ring gear 24 meshing with an output rotary member of the automatic transmission 18, and a pair of axles 28 connected to the differential gear device 26. The thus constructed power transmitting device 12 is suitably used for the vehicle 10 of an FF type (front-engine front-drive type). In the power transmitting device 12, a drive force produced by a drive power source in the form of the engine 14 is transmitted to the pair of drive wheels 30 through the torque converter 16, automatic transmission 18, differential gear device 26 and pair of axles 28.

The automatic transmission 18 constitutes a part of the power transmitting path between the engine 14 and the drive wheels 30, and is an automatic transmission of a planetary gear type having a plurality of planetary gear sets rotary elements of which are selectively connected to each other by a plurality of hydraulically operated frictional coupling devices, to select one of a plurality of gear positions (speed positions). For example, the automatic transmission 18 is a step-variable automatic transmission which is widely used on known vehicles and which is arranged to perform clutch-to-clutch shifting operations for establishing each of the gear positions on the basis of an amount of operation of an accelerator pedal 70 by the vehicle operator and/or a running speed V of the vehicle 10.

In the vehicle 10 of the present embodiment, a shifting mode of the automatic transmission 18 is switchable between an automatic shifting mode and a manual shifting mode. In the automatic shifting mode, the automatic transmission 18 is automatically shifted according to a shifting map (indicated in FIG. 3 by way of example) as a predetermined relation. In the manual shifting mode, the automatic transmission 18 is shifted according to a manual operation by the vehicle operator. The vehicle 10 is provided with a shift position selecting device in the form of a shift lever 40 which is disposed near a vehicle-operator's seat and which has a plurality of shift positions $P_{SH}$ including an automatic shifting position for selecting or establishing the automatic shifting mode, and a manual shifting position for selecting or establishing the manual shifting mode.

Namely, the shift lever 40 has five operating positions $P_{SH}$ consisting of: a parking position "P" (P position) for placing the automatic transmission 18 in a neutral state for placing its power transmitting path in a power cut-off state and for mechanically locking an output rotary member of the automatic transmission 18; a reverse drive position "R" (R position) for reverse driving of the vehicle 10; a neutral position "N" (N position) for placing the automatic transmission 18 in the above-indicated neutral state; an automatic forward drive position "D" (drive position, D position) provided as the above-indicated automatic shifting position for establishing the automatic shifting mode to implement an automatic shifting control for automatically shifting the automatic transmission 18 to one of its gear positions (speed positions) which is selected according to a known shifting map; and a manual forward drive position "M" (manual position, M position) provided as the above-indicated manual shifting position for establishing the manual shifting mode to implement a manual shifting control for shifting the automatic transmission 18 to one of its gear positions which is selected according to an operation of the shift lever 40.

The above-indicated manual forward drive position "M" is located at the same position as the above-indicated automatic forward drive position "D" in the longitudinal or front-and-rear direction of the vehicle 10 and is spaced apart from the automatic forward drive position D in the lateral or width direction of the vehicle 10. The automatic transmission 18 is manually shifted down or up from the presently established operating position to the next adjacent operating position during the shift lever 40 is operated to the manual forward drive position M. Described more specifically, the shift lever 40 has a shift-up position "+" and a shift-down position "−" on respective front and rear sides of the manual forward drive position M. The automatic transmission 18 is shifted up each time the shift lever 40 is operated to the shift-up position "+", and is shifted down each time the shift lever 40 is operated to the shift-down position "−". Thus the automatic transmission 18 can be shifted to a gear position which the operator desires based on an operation of the shift lever 40 by the operator. The shift lever 40 is biased by suitable biasing means such as a spring so that the shift lever 40 is automatically returned back to the manual forward drive position M after each operation to the shift-up position "+" or shift-down position "−".

The vehicle 10 is provided with an electronic control device 80 including controllers for implementing an output control of the engine 14 and a shift control of the automatic transmission 18, for example. The electronic control device 80 is principally constituted by a so-called "microcomputer" incorporating a CPU, a RAM, a ROM and an input-output interface, for instance. The CPU performs signal processing operations according to control programs stored in the ROM, while utilizing a temporary data storage function of the RAM, to implements various controls of the vehicle 10, such as the above-indicated output control of the engine 14 and the shift control of the automatic transmission 18. The electronic control device 80 may be configured to include an engine control portion for controlling the engine 14, a hydraulic control portion for controlling the shifting operation of the automatic transmission 18, and other control portions, as needed.

The electronic control device 80 is configured to receive output signals of various sensors, such as: an output signal of an engine speed sensor 50 indicative of an operating speed $N_E$ of the engine 14; an output signal of a transmission input speed sensor 52 indicative of an input speed $N_{IN}$ of the automatic transmission 18; an output signal of a transmission output speed sensor 54 indicative of an output speed $N_{OUT}$ of the automatic transmission 18, which corresponds to the vehicle running speed V; an output signal of an accelerator operation amount sensor 58 indicative of an operation amount (accelerator opening amount) $A_{CC}$ of the above-described accelerator pedal 70; an output signal of a throttle valve opening angle sensor 58 indicative of an opening angle $q_{TH}$ of an electronic throttle valve of the engine 14; an output signal of an air flow meter 60 indicative of an intake air quantity $Q_{AIR}$ of the engine 14; an output signal of a shift position sensor 62 indicative of the presently selected operating position $P_{SH}$ of the shift lever 40; an output signal $B_{ON}$ of a brake switch 64 indicative of an operation of a foot brake pedal 72; and an output signal $KD_{ON}$ of a kick-down operation detecting switch 66 indicative of a knock-down operation of the accelerator pedal 70. The electronic control device 80 is further configured to generate engine output control command signals $S_E$ for implementing the output control of the engine 14, and a hydraulic control command signal $S_P$ for controlling a hydraulic control unit 74 to implement the shift control of the automatic transmission 18.

The vehicle 10 is provided with a mechanism which permits the accelerator pedal 70 to be operated (depressed) by the vehicle operator even after the operation amount $A_{CC}$ has reached its maximum value (100% value). This operation of the accelerator pedal 70 will be referred to as "kick-down operation". The kick-down operation detecting switch 66 is provided to detect this kick-down operation of the accelerator pedal 70 and provides some click feeling when operated. Thus when a driver intends to make the kick-down operation, the driver may operate the accelerator pedal to the extent that the kick-down operation detecting switch provides the click feeling. The kick-down operation is defined to be a down-shift at or around the maximum operation amount $A_{CC}$ of the accelerator pedal 70 among so-called "power-on shift-down" operations of the automatic transmission 18 which are due to the operation of the accelerator pedal 70. It is noted that a relatively rapid increase of the operation amount $A_{CC}$ may be detected as the kick-down operation.

Figure 2:
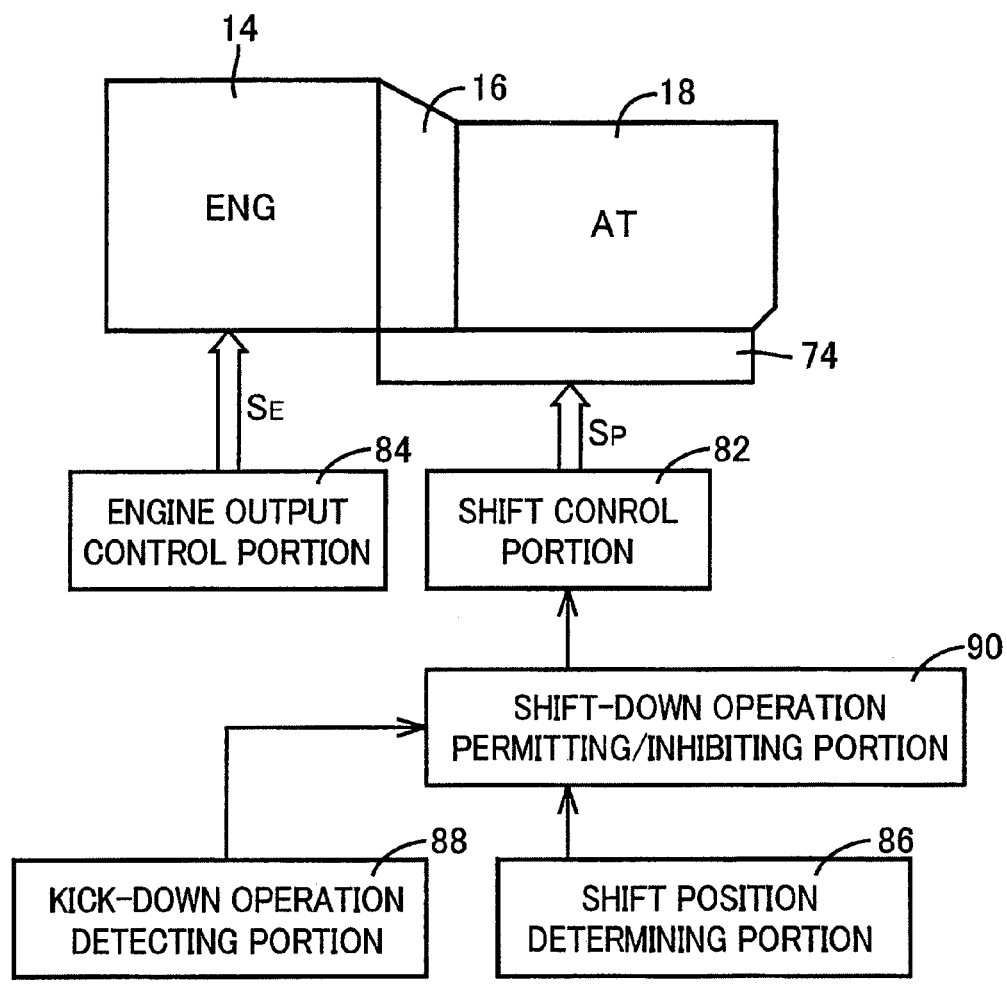
FIG. 2 is a functional block diagram showing major functional portions of an electronic control device of the control system.

FIG. 2 is the functional block diagram showing major functional portions of the electronic control device 80. As shown in FIG. 2, the electronic control device 80 includes a shift control portion or means 82, an engine output control portion or means 84, a shift position determining portion or means 86, a kick-down operation detecting portion or means 88, and a shift-down operation permitting/inhibiting portion or means 90. The shift control portion 82 is configured to implement the shift control of the automatic transmission 18. Described more specifically, the shift control portion 82 establishes the automatic shifting mode when it is determined that the presently selected operating position $P_{SH}$ of the shift lever 40 is the automatic forward drive position D. In the automatic shifting mode, the shift control portion 82 applies the hydraulic control command signal $S_P$ to the hydraulic control unit 74, to implement the automatic shifting control for automatically shifting the automatic transmission 18 to one of its gear positions (speed positions) which is selected on the basis of a state of the vehicle 10 as represented by the detected vehicle running speed V and operation amount $A_{CC}$ of the accelerator pedal 70, and according to a shifting map which is stored in the ROM of the electronic control device 80 and which represents a predetermined relationship between the vehicle state and the operating position of the automatic transmission 18 that is to be selected or established. The shifting map consists of shift-up boundary lines and shift-down boundary lines as respectively indicated by solid and broken lines in FIG. 3, by way of example. Thus, the automatic transmission 18 is automatically shifted up or down in the automatic shifting mode established in the automatic forward drive position D of the shift lever 40. The shift control portion 82 is also configured to establish the manual shifting mode when it is determined that the presently selected operating position $P_{SH}$ of the shift lever 40 is the manual forward drive position M. In the manual shifting mode, the shift control portion 82 applies the hydraulic control command signal Sp to the hydraulic control unit 74, to implement the manual shifting control for shifting the automatic transmission 18 to one of its gear positions (speed positions) which is selected according to the manual operation of the shift lever 40 by the vehicle operator from the manual forward drive position M to the shift-up position "+" or shift-down position "−", without depending upon the shifting map described above. Thus, the automatic transmission 18 is shifted up or down to the operating position manually selected by the vehicle operator in the manual shifting mode established in the manual forward drive position D of the shift lever 40.

The engine output control portion 84 is configured to calculate a target vehicle drive force F* on the basis of the detected operation amount $A_{CC}$ of the accelerator pedal 70 and vehicle running speed V, and according to a vehicle drive force map (not shown) which is obtained by experimentation and stored in the ROM and which represents a predetermined relationship between the vehicle running speed V and the target vehicle drive force F* employing the operation amount $A_{CC}$ of the accelerator pedal 70 as a parameter, for example. The vehicle drive force map is formulated such that the target vehicle drive force F* increases with a decrease of the vehicle running speed V and with an increase of the operation amount $A_{CC}$ of the accelerator pedal 70. Then, the engine output control portion 84 calculates a target torque $T_E^*$ of the engine 14 on the basis of the calculated target vehicle drive force F* and the gear position of the automatic transmission 18 established by the shift control portion 82, and according to the following equation (1) stored in the ROM, for example. The engine output control portion 84 generates the engine output control command signals $S_E$ to control a throttle actuator for adjusting the opening angle $q_{TH}$ of the electronic throttle valve of the engine 14, to control a fuel injection device for controlling an amount and timing of injection of a fuel into the engine 14, and to control an ignition device for controlling a timing of ignition of the engine 14.

$$T_E{}^*=(F^{}r_D)/(gGS^{}i^*t) \tag{1}$$

wherein $r_D$ is an effective radius of the drive wheels 30,
gG is a speed ratio of the automatic transmission 18 placed in the gear position determined by the shift control portion 82 (input speed $N_{IN}$/output speed $N_{OUT}$),
i is a final speed reduction ratio of a power transmitting path between an output rotary member of the automatic transmission 18 and driver power transmitting path on a side of the drive wheels 30,
t is a torque ratio of the torque converter 16.

The shift control portion 82 controls the hydraulic control unit 74 to cause the automatic transmission 18 to be shifted down upon detection of the kick-down operation of the accelerator pedal 70 by the kick-down operation detecting switch 66. This shift-down operation of the automatic transmission 18 as a result of the kick-down operation may take place during running of the vehicle 10 in the automatic shifting mode, as well as in the manual shifting mode in which the automatic transmission 18 can be shifted to a desired gear position according to a manual operation of the shift lever 40. When the kick-down operation is detected in the automatic shifting mode, the shift control portion 82 implements the automatic shifting control to shift down the automatic transmission 18 according to the shifting map indicated in FIG. 3. When the kick-down operation is detected in the manual shifting mode, the shift control portion 82 implements the manual shifting control to shift down the automatic transmission 18 from the presently established gear position to the next lower-speed gear position which is preliminarily set to be established as a result of the kick-down operation detected in the manual shifting mode and which is a lower gear position that has the speed ratio gG next higher than that of the presently established operating position.

Figure 3:
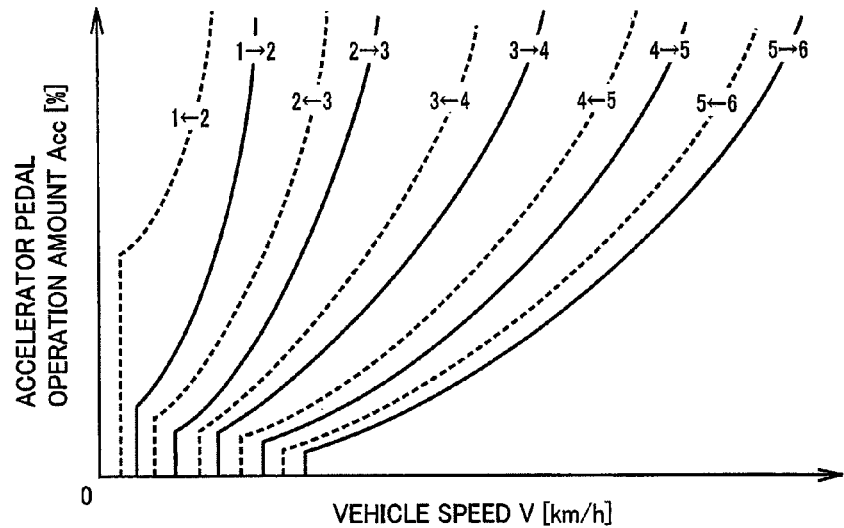
FIG. 3 is a view indicating an example of a shifting map used to determine or select one of the operating positions of the automatic transmission according to a basic shift control implemented by the electronic control device.

It is noted that a shift-down operation of the automatic transmission 18 causes an increase of the vehicle drive force F when the engine torque $T_E$ is kept unchanged. If the shift-down operation is performed without taking account of an amount of increase of the vehicle drive force to be caused by the shift-down operation, the vehicle drive force may increase by an amount larger than expected by the vehicle operator, giving the vehicle operator a discomfort with an unexpectedly large increase of the vehicle drive force. The shift-down operation of the automatic transmission 18 performed without depending upon the shifting map as indicated in FIG. 3 as a result of the kick-down operation of the accelerator pedal 70 in the manual shifting mode is considered to have a higher degree of possibility or likelihood of causing an increase of the vehicle drive force by an amount larger than expected by the vehicle operator, than the shift-down operations in the automatic shifting mode, which take place according to the shifting map, in which there is some consideration of an amount of change of the vehicle drive force.

In view of the above-indicated drawback, the electronic control device 80 according to the present embodiment is configured to inhibit the shift-down operation of the automatic transmission 18, that is, not to execute the shift-down operation, as a result of the kick-down operation detected in the manual shifting mode, if the amount of increase of the vehicle drive force F to be caused by the shift-down operation is larger than a predetermined upper limit F.

Figure 4:
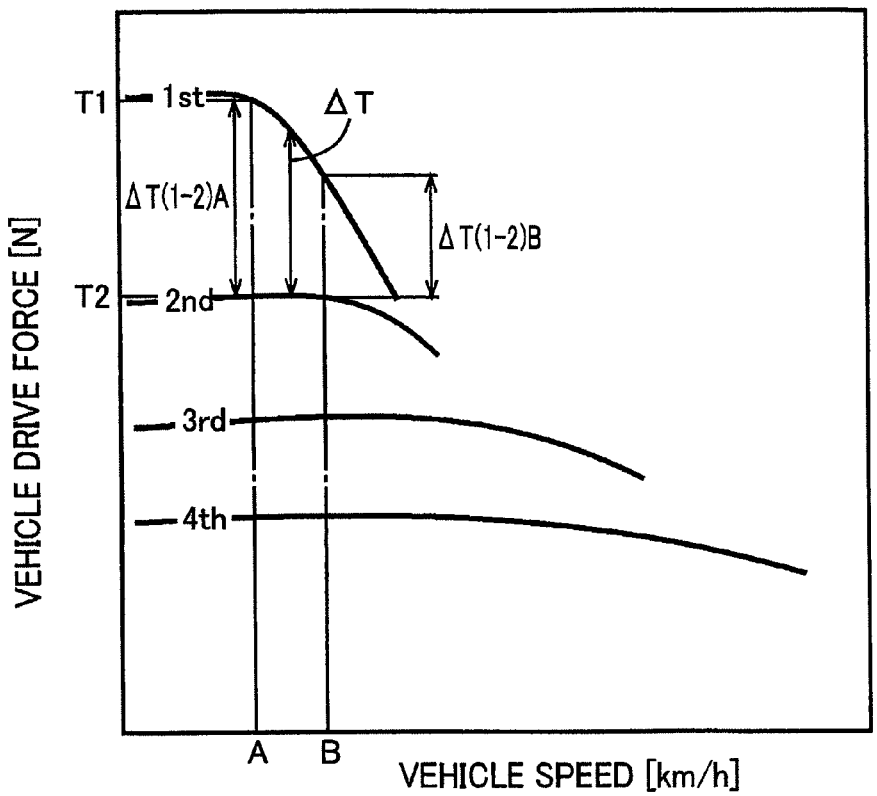
FIG. 4 is a view indicating an example of a drive force map representing a relationship between a maximum vehicle drive force in each of the gear positions of the automatic transmission and a running speed of the vehicle.

FIG. 4 is the view indicating an example of a drive force map representing a relationship between a maximum vehicle drive force Fmax in each of the gear positions (first through fourth speed positions) of the automatic transmission 18 and the vehicle running speed V. The maximum vehicle drive force Fmax in the drive force map of FIG. 4 corresponds to the vehicle drive force F obtained by only the engine torque $T_E$ when the electronic throttle valve has the maximum opening angle $q_{TH}$ (when the electronic throttle valve is fully opened). As indicated in FIG. 4, the amount of stepwise increase of the vehicle drive force F caused by the shift-down operation between the adjacent two gear positions is equal to a difference DT between the values of the maximum vehicle drive force Fmax in the adjacent two operating positions. For instance, the amount of stepwise increase of the vehicle drive force F caused by the shift-down operation from the second speed position ($2^{nd}$) to the first speed position (1st) when the vehicle running speed V is A[km/h] is equal to a difference DT(1-2)A=T1-T2, wherein T1 represents the vehicle drive force obtained in the first speed position while T2 represents the vehicle drive force obtained in the second speed position. As is also apparent from FIG. 4, the maximum vehicle drive force Fmax in each gear position (speed position) decreases with an increase of the vehicle running speed V, and this tendency of decrease of the maximum vehicle drive force Fmax increases with an increase of the speed ratio gG of the operating position. For instance, the tendency of decrease is highest in the first speed position ($1^{st}$) having the highest speed ratio gG, and is higher than that in the second speed position ($2^{nd}$). Accordingly, the difference DT between the values of the maximum vehicle drive force Fmax in the two gear positions increases with a decrease of the vehicle running speed V. For example, the vehicle drive force difference DT(1-2)A when the vehicle speed V is A[km/h] is larger than the vehicle drive force difference DT(1-2)B when the vehicle speed V is B[km/h]. Therefore, inhibiting the shift-down operation when the vehicle drive force difference DT is larger than the predetermined upper limit F' can be inhibited as described above, corresponds to inhibiting the shift-down operation when the vehicle running speed V is lower than a lower limit V' below which the vehicle drive force difference DT (amount of increase of the vehicle drive force F) is larger than the upper limit F. Accordingly, the electronic control device 80 according to the present embodiment is configured to inhibit the shift-down operation of the automatic transmission 18 as a result of the kick-down operation of the accelerator pedal 70 detected in the manual shifting mode, if the vehicle running speed V upon detection of the kick-down operation is lower than the lower limit V'. This lower limit V is a predetermined threshold value above which the vehicle drive force difference DT is not larger than the upper limit F'.

The upper limit F' of the vehicle drive force is a threshold value which is obtained as a difference DT (amount of increase of the vehicle drive force F) by experimentation and below which the shift-down operation performed as a result of the kick-down operation does not give the vehicle operator a discomfort with the amount of increase of the vehicle drive force F caused by the shift-down operation. The vehicle drive force difference DT of the two gear positions tends to increase with an increase of the speed ratio values gG of the two gear positions. Further, the maximum vehicle drive force values Fmax increase with an increase of the speed ratio values gG of the gear positions, so that even a relatively large amount of the vehicle drive force difference DT caused by the shift-down operation between the two gear positions having the relatively high speed ratio values gG is less likely to give the vehicle operator a discomfort with the increase of the vehicle drive force F. In view of these tendencies, the above-indicated upper limit F' is determined for each of the presently established gear positions (from which the automatic transmission 18 is shifted), such that the upper limit F' increases with the increase of the speed ratio gG of the presently established gear position, for example. There is also a tendency that when the vehicle running speed V is relatively high, the vehicle drive force F is relatively small with the automatic transmission 18 being placed in the relatively high-speed gear position having a relatively low value of the speed ratio gG. Therefore, even a relatively small amount of the vehicle drive force difference DT caused by the shift-down operation between the two gear positions having the relatively low speed ratio values gG is likely to give the vehicle operator a discomfort with the increase of the vehicle drive force F. In view of this tendency, the above-indicated lower limit V' is determined for each of the presently established gear positions of the automatic transmission 18 for which the upper limit F' is determined, such that the lower limit V' increases with the decrease of the speed ratio gG of the presently established operating position.

Referring back to FIG. 2, the shift position determining portion 86 is configured to determine whether the shift lever 40 is placed in the manual forward drive position M, that is, configured to determine whether that the manual shifting mode is established. This determination to detect the manual shifting mode is made on the basis of the output signal of the shift position sensor 62 indicative of the presently selected operating position $P_{SH}$ of the shift lever 40.

The kick-down operation detecting portion 88 is configured to determine whether a kick-down operation of the accelerator pedal 70 has been occurred by the vehicle operator, namely, configured to detect the kick-down operation. This determination is made on the basis of the output signal $KD_{ON}$ of the kick-down operation detecting switch 66. Namely, the kick-down operation detecting portion 88 detects whether the kick-down operation of the accelerator pedal 70 has been performed.

The shift-down operation permitting/inhibiting portion 90 is configured to determine whether the vehicle drive force difference DT between the values of the maximum vehicle drive force F, obtained in the two gear positions between which the automatic transmission 18 is to be shifted down, is larger than the predetermined upper limit F', assuming that the shift-down operation of the automatic transmission 18 is executed due to the kick-down operation when the manual shifting mode is detected by the shift position determining portion 86 and the vehicle-operator's kick-down operation is detected by the kick-down operation detecting portion 88. Namely, the shift-down operation permitting/inhibiting portion 90 is configured to determine whether the vehicle running speed V upon detection of the kick-down operation in the manual shifting mode is lower than the predetermined lower limit V'.

The shift control portion 82 is configured not to implement the shift-down operation of the automatic transmission 18 as a result of the kick-down operation of the accelerator pedal 70, if the shift-down operation permitting/inhibiting portion 90 inhibits the shift-down operation on the basis of its determination that the vehicle drive force difference DT is larger than or equal to the upper limit F', namely, that the vehicle running speed V is lower than the lower limit V'. If the shift-down operation permitting/inhibiting portion 90 permits the shift-down operation of the automatic transmission 18 on the basis of its determination that the vehicle drive force difference DT is smaller than the upper limit F', namely, that the vehicle running speed is not lower than the lower limit V', on the other hand, the shift control portion 82 implements the shift-down operation as a result of the kick-down operation.

Figure 5:
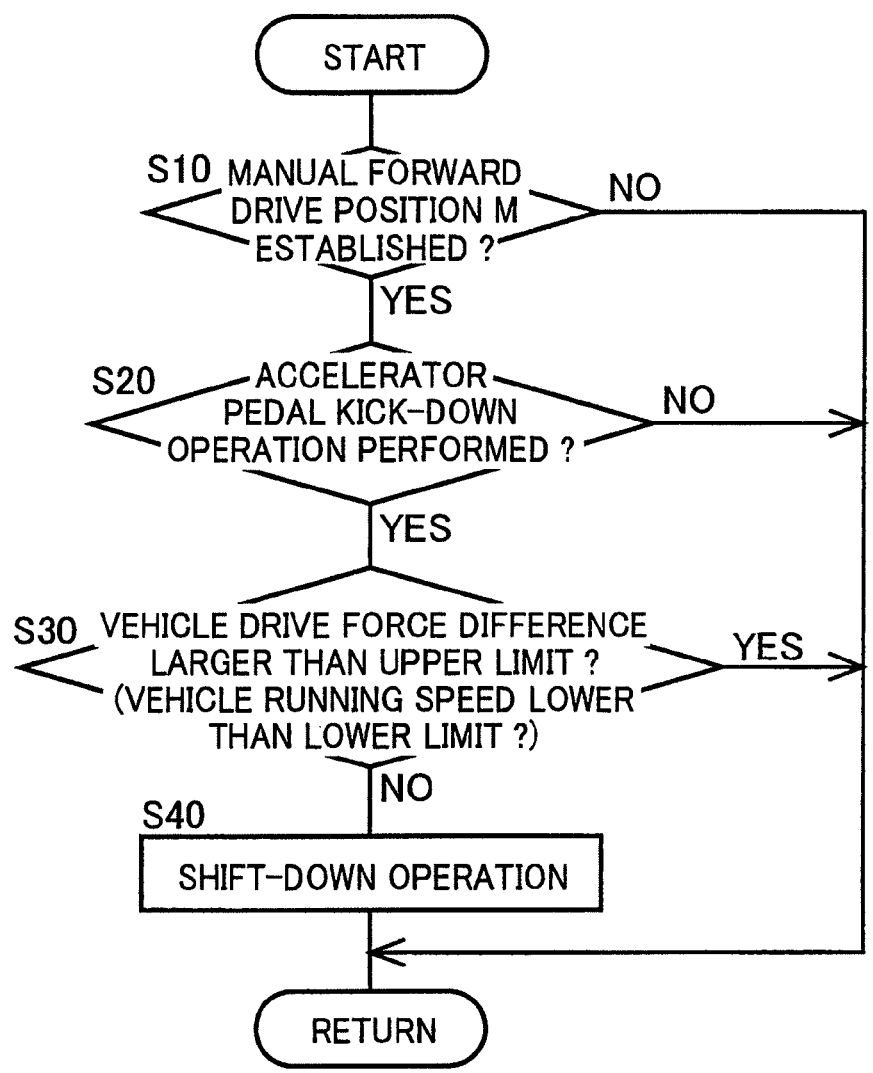
FIG. 5 is a flow chart illustrating a major portion of a control routine executed by the electronic control device, namely, a control routine implemented so as reduce or prevent a discomfort given to a vehicle operator as a result of a shift-down operation of the automatic transmission performed upon detection of a kick-down operation of an accelerator pedal by the vehicle operator.

FIG. 5 is the flow chart illustrating a major portion of a control routine executed by the electronic control device 80, namely, a control routine implemented so as reduce or prevent a discomfort given to the vehicle operator as a result of the shift-down operation of the automatic transmission 18 performed upon detection of the kick-down operation of the accelerator pedal 70 by the vehicle operator. This control routine is repeatedly executed with an extremely short cycle time of several milliseconds to several tens of milliseconds, for instance.

The control routine of FIG. 5 is initiated with step S10 corresponding to the shift position determining portion 86, to determine whether the shift lever 40 is placed in the manual forward drive position M, on the basis of the output signal of the shift position sensor 62 indicative of the presently selected operating position $P_{SH}$ of the shift lever 40. If a negative determination (NO) is obtained in step S10, one cycle of execution of the control routine is terminated. If an affirmative determination (YES) is obtained in step S10, the control flow goes to step S20 corresponding to the kick-down operation detecting portion 88, to determine whether the kick-down operation of the accelerator pedal 70 has been performed by the vehicle operator, on the basis of the output signal $KD_{ON}$ of the kick-down operation detecting switch 66. If a negative determination (NO) is obtained in step S20, one cycle of execution of the control routine is terminated. If an affirmative determination (YES) is obtained in step S20, the control flow goes to step S30 corresponding to the shift-down operation permitting/inhibiting portion 90, to determine whether the vehicle drive force difference DT in the two gear positions between which the automatic transmission 18 is to be shifted down as a result of the vehicle-operator's kick-down operation is larger than the predetermined upper limit F', namely, to determine whether the vehicle running speed V upon detection of the kick-down operation is lower than the predetermined lower limit V'. If an affirmative determination (YES) is obtained in step S30, one cycle of execution of the control routine is terminated, without the shift-down operation of the automatic transmission 18 being performed as a result of the kick-down operation. If a negative determination (NO) is obtained in step S30, the control flow goes to step S40 corresponding to the shift control portion 82, to implement the manual shifting control for performing the shift-down operation of the automatic transmission 18 as a result of the kick-down operation.

The vehicle 10 has a tendency that the maximum vehicle drive force Fmax obtained in each of the gear positions of the automatic transmission 18 decreases with an increase of the vehicle running speed V, so that the amount of increase of the vehicle drive force (vehicle drive force difference DT) caused by each shift-down operation of the automatic transmission 18 increases with a decrease of the vehicle running speed V. According to the present embodiment of the invention, the shift-down operation permitting/inhibiting portion 90 is configured to inhibit the shift-down operations of the automatic transmission 18 as a result of the kick-down operation of the vehicle accelerating member in the form of the accelerator pedal 70, if the vehicle running speed V upon detection of the kick-down operation is lower than or equal to the lower limit predetermined for the presently established or selected gear position of the automatic transmission 18. Accordingly, the shift-down operation permitting/inhibiting portion 90 prevents or reduces a discomfort given to the vehicle operator as a result of the shift-down operations of the automatic transmission 18 which cause an increase of the vehicle drive force by an amount larger than expected by the vehicle operator who has performed the kick-down operation of the accelerator pedal 70.

The present embodiment is further configured such that the shift-down operation permitting/inhibiting portion 90 may inhibit the shift-down operations to be otherwise performed as a result of the kick-down operation of the accelerator pedal 70 performed while the manual shifting mode is established. Accordingly, it is possible to effectively inhibit the shift-down operations of the automatic transmission 18 which would be likely to give the operator a discomfort with an unexpectedly large amount of increase of the vehicle drive force when the kick-down operation is performed during running of the vehicle in the manual shifting mode. Thus, the present embodiment may prevent or reduce a discomfort given to the vehicle operator regarding shift-down operations of the automatic transmission 18 due to kick-down operations.

The present embodiment is further configured such that the kick-down operation detecting portion 88 detects the kick-down operation of the vehicle accelerating member in the form of the accelerator pedal 70 when the kick-down operation detecting switch 66 has been operated by the kick-down operation. Accordingly, it is possible to effectively prevent or reduce the discomfort given to the vehicle operator regarding shift-down operations of the automatic transmission 18 as a result of detection in the kick-down operation detection switch 66.

The present embodiment is further configured such that the difference DT between the values of the maximum vehicle drive force Fmax obtained in the respective adjacent two positions of the operating positions of the automatic transmission 18 increases with a decrease of the running speed V of the vehicle 10, and the lower limit V' of the running speed V is a value above which the vehicle drive force difference DT does not exceed the upper limit F' predetermined for the presently established one of the operating positions of the automatic transmission 14. Accordingly, it possible to effectively prevent or reduce the discomfort given to the vehicle operator when the automatic transmission 14 is shifted down as a result of the kick-down operation of the accelerator pedal 70.

The present embodiment is further configured such that the above-described lower limit V' of the vehicle running speed V is predetermined so as to increase with a decrease of the speed ratio gG of the presently established one of the gear positions of the automatic transmission 18. In this respect, it is noted that the vehicle 10 runs at a relatively high speed V or with a relatively small vehicle drive force F when the speed ratio gG of the presently established gear position of the automatic transmission 18 is relatively low. Since the lower limit V' is predetermined as described above, the shift-down operation permitting/inhibiting portion 90 inhibits the shift-down operation which is likely to give the vehicle operator a discomfort with an unexpectedly large amount of an increase of the vehicle drive force caused by the shift-down operation.

While the preferred embodiment of this invention has been described above in detail by reference to the drawings, it is to be understood that the invention may be otherwise embodied.

In the illustrated embodiment described above, the shift control portion 82 is configured to cause a shift-down operation of the automatic transmission 18 from the presently established operating position (e.g., $2^{nd}$ speed position) to the next adjacent lower-speed operating position (e.g., $1^{st}$ speed position), upon detection of the kick-down operation of a vehicle accelerating member in the form of the accelerator pedal 70 in the manual shifting mode. However, the shift control portion 82 may be configured to cause the shift-down operation of the automatic transmission 18 from the presently established position (e.g., $3^{rd}$ speed position) to any predetermined final (target) lower-speed gear position (e.g., $1^{st}$ speed position) other than the next adjacent lower-speed gear position (e.g., $2^{nd}$ speed position). In this case, the shift-down operation permitting/inhibiting portion 90 may inhibit at least the shift-down operation to the above-indicated predetermined final lower-speed gear position (e.g., $1^{st}$ speed position) at the vehicle running speed V lower than the lower limit V' upon the kick-down operation, but may permit the shift-down operation to the next adjacent or other lower-speed gear position (e.g., $2^{nd}$ speed position). That is, the shift-down operation permitting/inhibiting portion 90 may be configured to restrict the shift-down operation as a result of the kick-down operation by inhibiting only the shift-down operation to the predetermined final lower-speed operating position and permitting at least the shift-down operation to the next adjacent or other lower-speed operating position. Namely, only the shift-down operation(s) that is/are likely to give the vehicle operator a discomfort with an unexpectedly large amount of increase of the vehicle drive force caused by the shift-down operation to be performed as a result of the kick-down operation is (are) inhibited, but the other shift-down operation(s) is (are) permitted, therefore the vehicle operator's desire to increase the vehicle drive force F by the kick-down operation is partially satisfied. The above-indicated predetermined final lower-speed gear position to which the automatic transmission 18 is inhibited to be shifted down is predetermined gear position lower than the next adjacent lower-speed position, that is, the final lower-speed gear position may be the second or third lower position counted from the presently established operating position in the direction of decrease of corresponding speed vehicle.

In the illustrated embodiment, one of the gear positions of the automatic transmission 18 is manually selected according to the operation of the shift lever 40 in the manual shifting mode. However, the manual shifting mode may be modified such that the automatic transmission 18 is automatically shifted in the manual shifting mode, within a narrower shift range than in the automatic shifting mode, that is, automatically shifted to one of the operating positions the number of which on higher speed side is limited to be smaller than that in the automatic shifting mode. That is, one of the shift range can be selected manually according to the operation of the shift lever 40 in the manual shifting mode. The principle of the present invention to selectively permit and inhibit the shift-down operations is also applicable to a vehicle control apparatus incorporating this modification regarding the shifting operations of the automatic transmission 18 in the manual shifting mode.

In the illustrated embodiment, the kick-down operation detecting portion 88 is configured to detect the kick-down operation of the accelerator pedal 70 on the basis of the on or off state of the kick-down operation detecting switch 66. However, the kick-down operation detecting portion 88 may be modified to detect the kick-down operation based on detection of exceeding a predetermined threshold of the detected operation amount $A_{CC}$ of the accelerator pedal 70 or a detected rate of increase of the operation amount $A_{CC}$. The principle of the invention is also applicable to a vehicle control apparatus incorporating this modification of the kick-down operation detecting portion 88.

In the illustrated embodiment, the shift-down operation permitting/inhibiting portion 90 selectively permits or inhibits (restricts) the shifting operations of the automatic transmission 18 in the manual shifting mode in which the shifting operations are more likely to cause an amount of increase of the vehicle drive force larger than expected by the vehicle operator, than in the automatic shifting mode. In the automatic shifting mode, too, there is some degree of possibility or likelihood that the shift-down operations cause an unexpectedly large amount of increase of the vehicle drive force. In this respect, the principle of the present invention is also applicable to the shifting operations in the automatic shifting mode. In the automatic shifting mode, the automatic transmission 18 may be shifted from the present gear position (e.g., $3^{rd}$ speed position) to the final lower-speed gear position (e.g., $1^{st}$ speed position) which is two or more steps lower the present gear position, depending upon the vehicle-operator's required vehicle drive force. In this case, the shift-down operation permitting/inhibiting portion 90 may restrict, in the automatic shifting mode, at least the shift-down operation to the above-indicated final lower-speed gear position which is to be performed as a result of the kick-down operation or may inhibit the shift-down as a result of the kick-down operation when the vehicle running speed V at the kick-down operation is lower than the lower limit V'. Namely, only the shift-down operation is inhibited that is likely to give the vehicle operator a discomfort with an unexpectedly large amount of increase of the vehicle drive force caused by the shift-down operation to be otherwise performed as a result of the kick-down operation, but the other shift-down operation is permitted, thus the vehicle operator's desire to increase the vehicle drive force F by the kick-down operation is partially satisfied.

While the automatic transmission 18 in the illustrated embodiment is of a planetary gear type, this planetary gear type automatic transmission 18 may be replaced by a continuously variable transmission, a so-called dual clutch transmission (DCT), or any other type of automatic transmission. Where the continuously variable transmission is provided, the electronic control device 80 is modified so as to inhibit a change of the speed ratio (gear ratio) or input speed of the continuously variable transmission to a value corresponding to the speed ratio of the lower-speed gear position of the automatic transmission 18 the shift-down operation to which is inhibited in the illustrated embodiment.

In the illustrated embodiment, the stored predetermined upper limit F' of the vehicle drive force difference DT and the stored predetermined lower limit V' of the vehicle running speed V are obtained on the basis of the amount of increase of the vehicle drive force F caused by the shift-down operation in question of the automatic transmission 18. However, these upper limit F' and lower limit V' may be changed with a change of the gradient or surface condition of the roadway on which the vehicle is running. For example, the upper limit F' is made smaller (or the lower limit V' is made larger) in a "snow" drive mode selected by the vehicle operator to deal with a slippery surface condition of the roadway, than in a "power drive" mode selected by the vehicle operator in which the vehicle operator desires to drive the vehicle 10 with a higher degree of acceleration or drivability, so that the shift-down operations are more effectively inhibited (restricted) in the snow drive mode.

Although the torque converter 16 is provided as a fluid-operated power transmitting device in the illustrated embodiment, the torque converter 16 may be replaced by a fluid coupling which does not have a torque amplifying function.

Further, the power transmitting system 12 need not be provided with the fluid-operated power transmitting device.

It is to be understood that the preferred embodiment and its modifications have been described above, for illustrative purpose only, and that the present invention may be embodied with various other modifications and improvements, which may occur to those skilled in the art.

REFERENCE SIGNS LIST

10 Vehicle
14 Engine (Drive power source)
18 Automatic transmission
30 Drive wheels
40 Shift lever (Shift position selecting device)
66 Kick-down operation switch
80 Electronic control device (Control apparatus)

The invention claimed is:

1. A control apparatus for controlling a vehicle having an automatic transmission arranged to transmit a vehicle drive force from a drive power source of the vehicle to drive wheels of the vehicle, such that a shift-down operation of the automatic transmission is performed as a result of a kick-down operation, the control apparatus comprising:
   a shift-down operation permitting/inhibiting portion configured to restrict the shift-down operation of the automatic transmission as a result of the kick-down operation, if a running speed of the vehicle upon detection of the kick-down operation is lower than a lower limit predetermined for a presently established gear positions or speed ratio of the automatic transmission.

2. The control apparatus according to claim 1, wherein the shift-down operation permitting/inhibiting portion restricts the shift-down operation as a result of the kick-down operation such that the shift-down operation of the automatic transmission is inhibited at least to a predetermined final gear position thereof or to a predetermined final speed ratio thereof, upon detection of the kick-down operation.

3. The control apparatus according to claim 1, wherein the vehicle has a shift position selecting device configured to select one of an automatic shifting position for establishing an automatic shifting mode in which the automatic transmission is automatically shifted, and a manual shifting position for establishing a manual shifting mode in which the automatic transmission is manually shifted by an operation by the vehicle operator, and wherein the shift-down operation permitting/inhibiting portion restricts the shift-down operation to be performed as a result of the kick-down operation performed while the manual shifting mode is established.

4. The control apparatus according to claim 3, further comprising a shift control portion configured to shift down the automatic transmission from a presently established gear position or the speed ratio corresponding to the gear position to a next adjacent lower-speed the gear position or the speed ratio, or to any gear position lower than said next adjacent lower-speed operating position or the speed ratio, upon detection of the kick-down operation while the manual shifting mode is established,
   and wherein the shift-down operation permitting/inhibiting portion inhibits the shift-down operation of the automatic transmission as a result of the kick-down operation in the manual shifting mode, if the running speed of the vehicle upon detection of the kick-down operation is lower than the lower limit.

5. The control apparatus according to claim 1, wherein the vehicle has a kick-down operation detecting switch configured to detect an operation of the vehicle accelerating member after an amount of operation of the vehicle accelerating member has reached a nominal maximum value, and the kick-down operation is detected when the kick-down operation detecting switch is operated.

6. The control apparatus according to claim 1, wherein the drive power source includes an engine, and a drive force difference between values of a maximum vehicle drive force obtained in respective two positions of the gear positions or speed ratios of the automatic transmission increases with a decrease of the running speed of the vehicle, and wherein the lower limit of the running speed is a value above which said difference does not exceed an upper limit predetermined for said presently established gear position or speed ratio of the automatic transmission.

7. The control apparatus according to claim 1 wherein said lower limit of the running speed of the vehicle is predetermined so as to increase with a decrease of a speed ratio of the presently established gear position of the automatic transmission, the speed ratio being a ratio of an input speed of the automatic transmission to an output speed of the automatic transmission.

* * * * *